March 16, 1965  M. L. ANTHONY  3,173,204
CONTROL FOR TOOL STORAGE MATRIX, USING INDIVIDUAL
RE-SETTABLE CODE DATA REGISTERS
Filed May 23, 1961  3 Sheets-Sheet 1
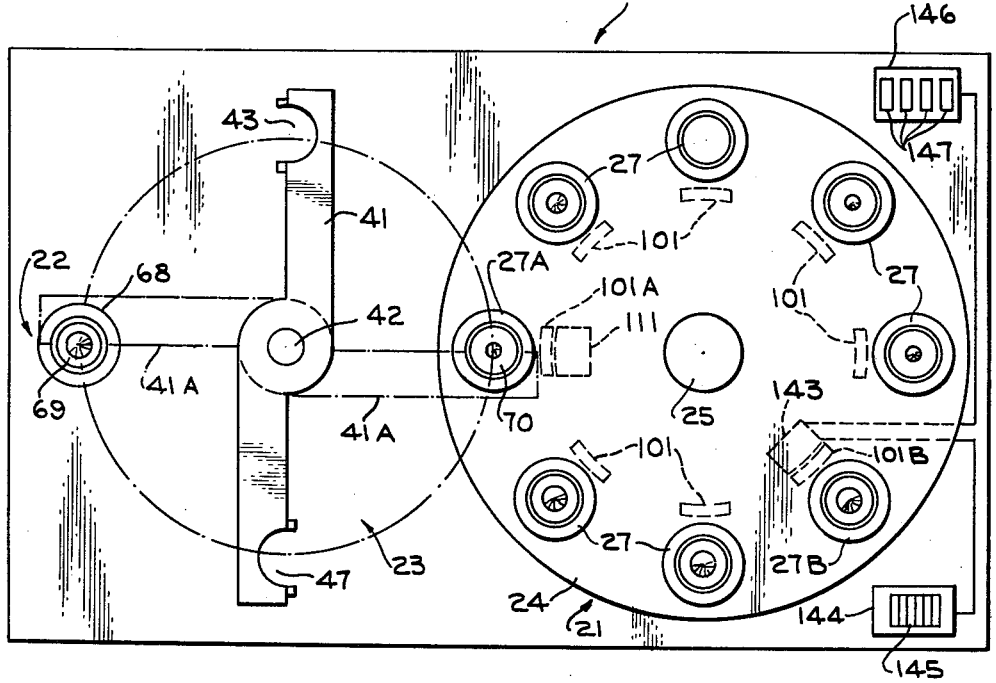
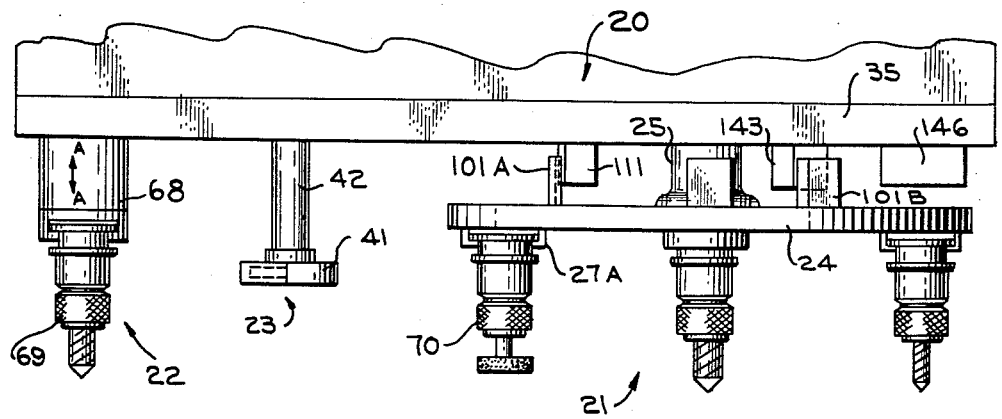
INVENTOR.
MYRON L. ANTHONY

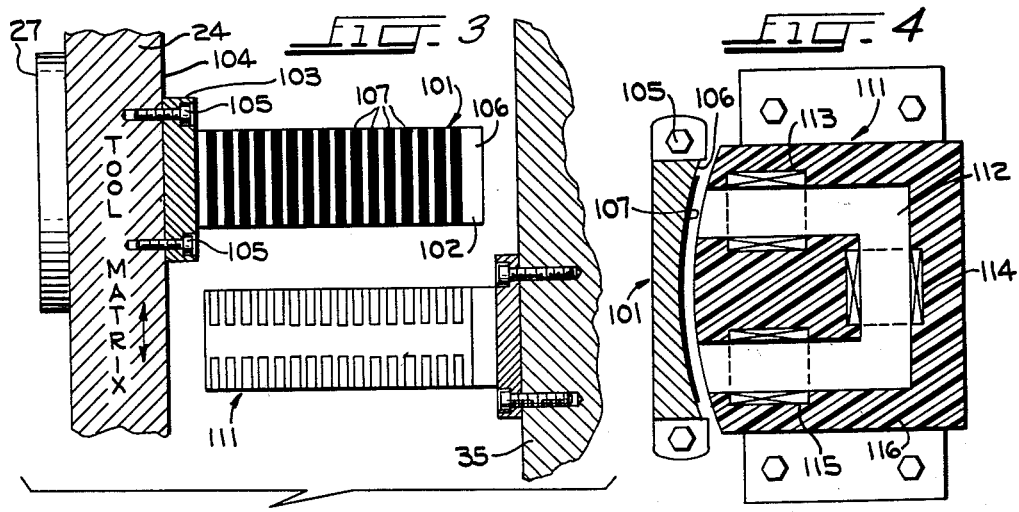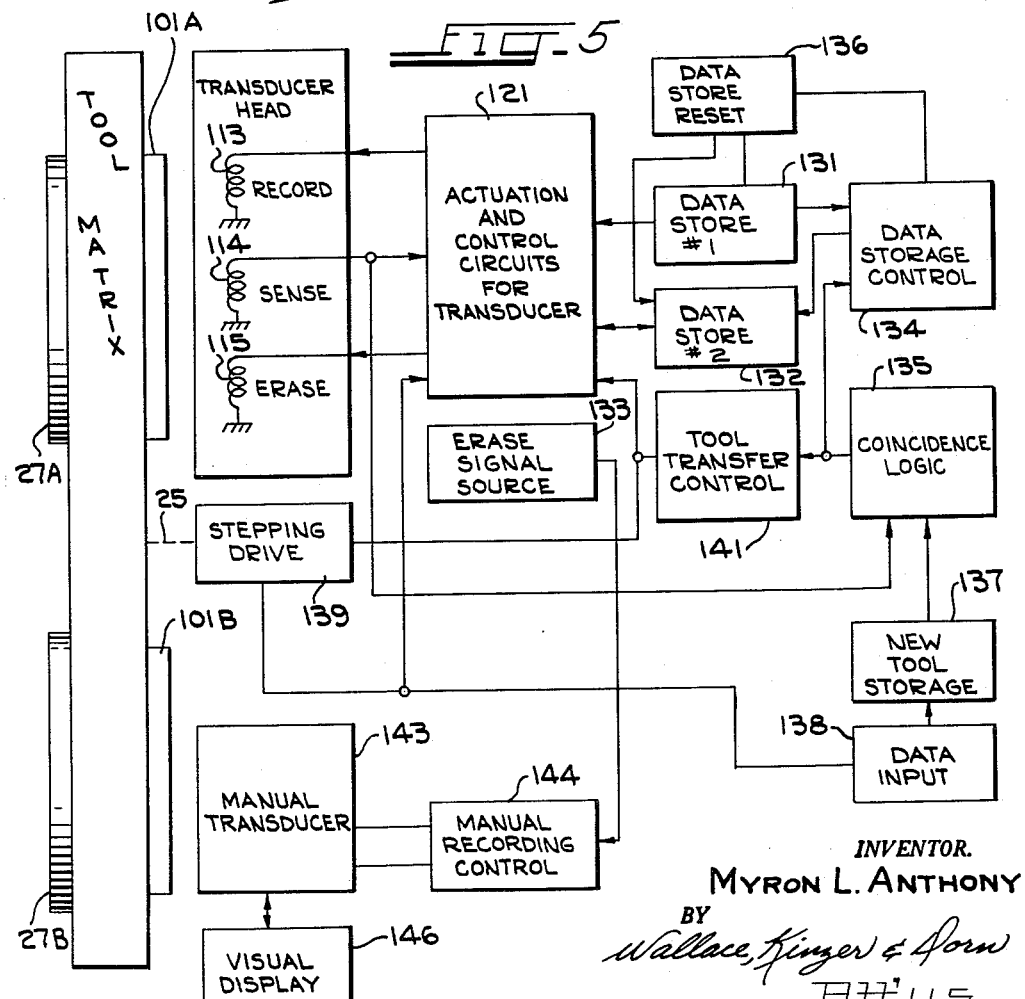

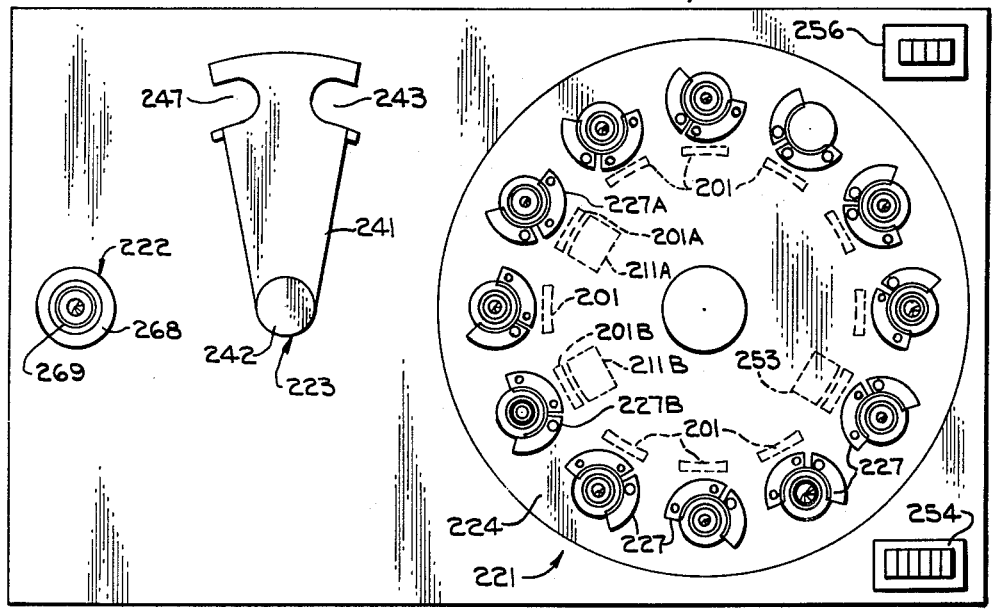
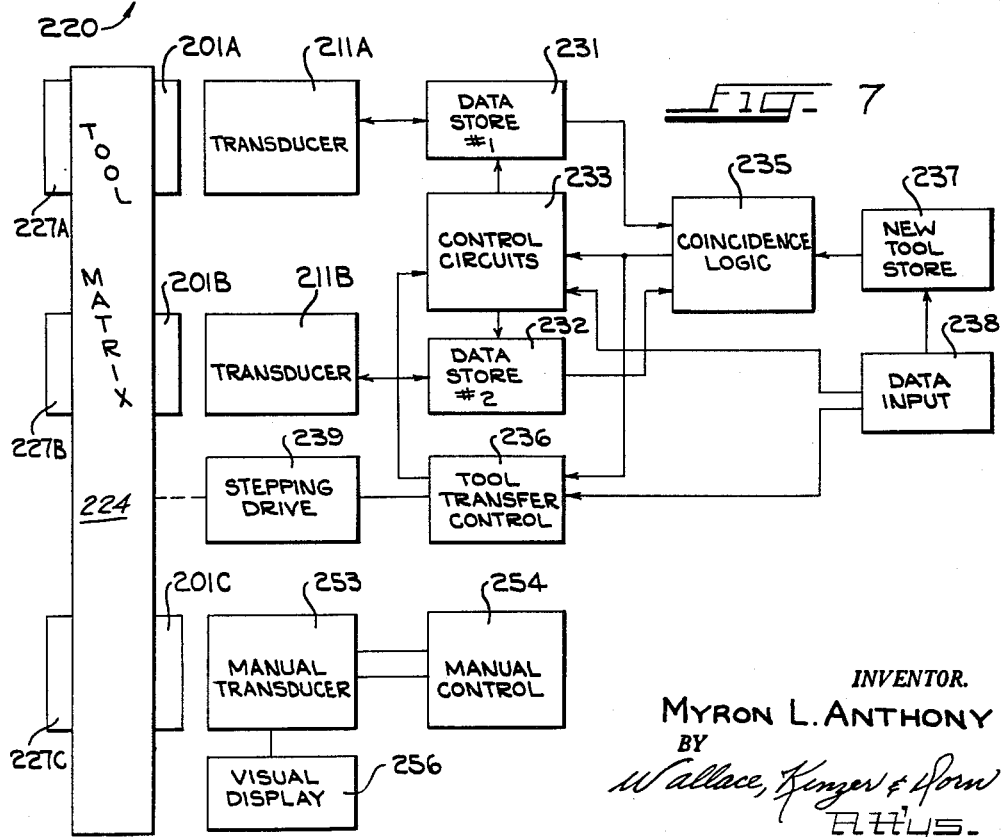

United States Patent Office 3,173,204
Patented Mar. 16, 1965

3,173,204
CONTROL FOR TOOL STORAGE MATRIX, USING INDIVIDUAL RE-SETTABLE CODE DATA REGISTERS
Myron L. Anthony, La Grange, Ill., assignor to Scully-Anthony Corporation, La Grange, Ill., a corporation of Illinois
Filed May 23, 1961, Ser. No. 111,973
14 Claims. (Cl. 29—568)

This invention relates to a new and improved tool transfer system for machine tools, and particularly to new and improved coded identification devices and code sensing apparatus for tool transfer systems.

Increasing emphasis upon automation of machine tool operations has resulted in the development of several systems for controlling the transfer of individual tools, in a machine tool, from a storage station to a work station and back to the storage station. One such system provides for programming and control in accordance with the physical location of the individual tools in a tool matrix. Tools are removed from the matrix in a predetermined order, tool identification being based upon the tool position in the matrix; each tool must be returned to its original matrix position. Another system used heretofore provides for random storage of individually coded tools in a tool matrix or storage station. This system is more sophisticated than the position-code system and results in more flexible machine operation. In this system, each tool or toolholder is directly encoded with data identifying the tool, and means are provided to enable the machine to recognize and locate the desired tool independently of its position in the tool matrix. The tool changing cycle may be relatively simple because it is only necessary to interchange the tool at the work station with the next required tool in the matrix.

Yet another data control system for machine tools utilizes a plurality of individual code members each bearing code indicia identifying an individual tool. Means are provided for removably mounting the individual code members at a tool storage station in association with the respective tools that they identify. The system includes means for sensing the code indicia on the code members at the storage station; control means, coupled to the sensing means, are employed to actuate the tool transfer means to transfer preselected tools from the storage station to the work station and back to the storage station. This control means includes means for storing data identifying the tool while it is separated from its code member, thereby enabling the control means to restore each tool to a position, in the storage station, in which it is associated with the correct code member. This system is described in detail in the co-pending application of Myron L. Anthony, Serial No. 79,272, filed December 29, 1960.

In a tool identification system that provides for random storage, with code data carried by each individual toolholder, the cost of the toolholders becomes relatively high. Furthermore, mounting of the code elements utilized to encode the toolholders may present a substantial problem, which may be intensified when it is desired to re-use the same toolholder and, accordingly, to change the code data carried by the toolholder. The key code system set forth in general terms hereinabove avoids these difficulties but does not provide for completely random replacement of tools in the tool matrix, unless some provision is made for storing the code key or other code element at some point displaced from the tool matrix while the associated tool is in use.

It is a principal object of the present invention, therefore, to provide a new and improved data control system of the random access type which effectively eliminates the difficulties and problems presented by prior art systems as noted hereinabove. A related object of the invention is to provide a new and improved random access data control system, for a machine tool, in which tool identification data can be easily and conveniently set up by the machine tool operator.

A particular object of the invention is to provide a high capacity tool coding system, having a relatively high storage density, which does not require the use of expensive toolholders and which avoids any substantial increase in the criticality of tolerances permissible in the tool storage matrix of the machine.

Another object of the invention is to provide a new and improved tool identification system adaptable to use with a wide variety of different kinds of recording and sensing apparatus.

A further object of the invention is to permit the loading of new tools into a tool storage matrix, in a machine tool, near the end of a given machining operation, without interfering with the completion of the machining operation.

Accordingly, the present invention is directed to a data control system for a machine of the kind comprising a tool storage station for storing a plurality of tools, a work station, and tool transfer means for transferring tools between those stations. The data control system comprises a plurality of individual record members that are associated with respective tool storage locations in the storage station. Each record member affords a record medium for registering code data identifying an individual tool. Sensing means are provided for sensing the code data recorded on the record members. Means are also provided for clearing the code data from a record member upon removal of the associated tool from the storage station. The code data identifying a tool are stored in a separate data storage means as long as the tool is separated from the tool storage station. The system also includes means, coupled to the aforementioned data storage means, for automatically recording the identifying code data for a given tool on one of the record members upon transfer of the tool to the storage location in the storage station that is associated with that record member. Control means are also provided for actuating the transfer means of the machine to transfer selected tools between the storage and work stations, and these control means are coupled to and controlled by the aforementioned sensing means.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a simplified front elevation view of a tool transfer system for a machine tool in which the present invention is incorporated;

FIG. 2 is a plan view of the tool transfer system illustrated in FIG. 1;

FIG. 3 is a detail elevation view illustrating a record member and associated sensing head utilized in a preferred embodiment of the present invention;

FIG. 4 is a detail sectional view of the sensing head and record member in recording and sensing position relative to each other;

FIG. 5 is a block diagram of the electrical control system for a tool identification system constructed in accordance with the present invention;

FIG. 6 is a simplified elevation view of a different tool transfer system which incorporates a further embodiment of the present invention; and FIG. 7 is a simplified block diagram of an electrical control system for the tool transfer apparatus illustrated in FIG. 6.

FIGS. 1 and 2 illustrate, in simplified form, a tool transfer system for an automatically controlled machine tool 20. In general, the system comprises a tool storage means 21, a work station 22, and tool transfer means 23 for transferring tools between the work station 22 and the storage station 21. The construction of the work station 22, the transfer mechanism 23, and the individual tool receptacles of the tool storage station 21 are not critical with respect to the present invention; accordingly, these portions of the machine are not described in detail herein.

The tool storage station 21 comprises a tool matrix 24 that is mounted for rotation upon a shaft generally indicated at 25. The tool matrix 24 includes a base plate upon which a plurality of individual toolholder cartridges or receptacles 27 are mounted. In the illustrated construction, there are eight of the individual toolholder cartridges 27. It should be understood, however, that any desirable number of cartridges or holding devices, comparable to the receptacles 27, may be included in the toolholder matrix 24, depending upon the capacity desired for the machine tool 20. Each of the receptacles includes a suitable clamp or other holding device capable of releasably mounting a toolholder in the matrix 24.

The transfer mechanism 23 comprises a transfer arm 41 mounted for rotation upon a shaft 42. The arm 41 carries a first clamp 43 at one end thereof. A second clamp 47 is included in the transfer arm structure, at the opposite end of the arm, both clamps being shown in open position. The transfer mechanism 23 may further include means (not illustrated) mounted on the transfer arm 41 for latching each of the clamps 43 and 47 in closed position, to hold a toolholder in the clamp. Suitable sensing switches or similar devices may be used to determine the operating condition of the transfer clamps 43 and 47, being mounted on the transfer arm 41.

The work station 22 of the machine illustrated in FIGS. 1 and 2 may be generally conventional in construction. This portion of the system 20 comprises a chuck 68, mounted on a suitable spindle, for mounting a toolholder in working position. A toolholder 69 is shown mounted in the cuhck in FIGS. 1 and 2. Means are provided for rotating the spindle and chuck 68 and for moving the chuck axially, in the course of a machining operation, as indicated by the arrows A in FIG. 2. Inasmuch as the mechanism for advancing and retracting the chuck 68 and for driving the chuck and spindle rotationally, during a machining operation, may be conventional and does not comprise a part of the present invention, the details of this mechanism are not illustrated in the drawings. It will also be recognized that other conventional parts of the machine tool such as a movable table for the work, etc., have been omitted from the drawing to simplify the same.

In considering the operation of the system illustrated in FIGS. 1 and 2, it may first be assumed that the transfer arm 41 is located in the "home" position shown in FIG. 1 with both of the jaws 43 and 47 open and empty. Furthermore, it may be assumed that a toolholder 70 is clamped in the cartridge 27A at the transfer location of the storage station 21, and that this particular tool is the one desired for use during the next operating cycle of the machine. In addition, it may be assumed that spindle 68 is in its tool-transfer position. Under these conditions, the transfer arm 41 is rotated in a counterclockwise direction to bring the open jaw 43 into alignment with the toolholder mounted in the receptacle 27A. The position of the transfer arm 41, at this time, is generally indicated by the dash line 41A. As illustrated in FIG. 1, when the transfer arm 41 is in the position 41A, the other clamp 47 on the transfer arm engages the toolholder 69 that is mounted in the spindle chuck 68.

When the transfer arm 41 has been moved to the position 41A, the clamping devices 43 and 47 are actuated to grip the toolholders 70 and 69 respectively. Subsequently, the toolholder 70 is released from the cartridge or clamp 27A; at the same time, the toolholder 69 is released from the chuck 68. To remove the toolholders 69 and 70 from the chuck and from the storage matrix, respectively, it may be necessary to impart some auxiliary motion of the transfer arm 41. Thus, and as in one known system, the transfer arm 41 may be moved outwardly of the storage matrix and the spindle chuck to extract the toolholders from engagement with the spindle chuck and the matrix. On the other hand, a uniplanar system may be utilized if the spindle chuck and the toolholder receptacles in the storage matrix are constructed to afford this kind of operation.

After the toolholders 69 and 70 are released, the transfer arm 41 is rotated further to a position displaced 180° from that indicated by the dash outline 41A. This brings the toolholder 70 into alignment with the chuck 68 and also disposes the toolholder 69 in alignment with the receptacle at the transfer location 27A in the storage matrix 24. The toolholder 70 is then engaged in the chuck 68 and the tool 69 is mounted in the receptacle 27A. This action may entail a return auxiliary movement of the transfer arm 41 toward the storage matrix 24 and the spindle chuck 68. The clamps 43 and 74 are then released and the transfer arm 41 is returned to its initial or "home" position as shown in solid lines in FIG. 1, being held in this position awaiting the next tool transfer cycle.

Insofar as the present invention is concerned, it is by no means essential that the transfer mechanism and the operating cycle described hereinabove be followed in detail. Rather, the invention is applicable to tool transfer apparatus of substantially different construction operated in accordance with quite different cycles or sequences, as is made apparent in the description of the mechanisms of FIGS. 6 and 7 set forth hereinafter.

In the operation of the tool transfer system of the machine 20, it is necessary to provide a means for identifying the tools or toolholders to be removed from the matrix 24. It is also necessary to provide some means for maintaining identification of a tool while it is disposed at the work station 22 and for again establishing the identity of the tool when it is returned to the matrix 24 after use. This is particularly true where a given tool may be used two or more times in a course of a relatively complex machining operation. The present invention is directed to an identification and control system used for these purposes.

In addition to tool or toolholder receptacles such as the devices 27, the tool storage station or matrix 24 is provided with a plurality of individual record members 101 that are associated with the individual tool storage locations established by the receptacles 27. Each of the record members 101 affords a recording medium for registering code data identifying an individual tool in the storage station 21. Furthermore, these record members, in accordance with the present invention, are of a kind which can be readily set or recorded in accordance with predetermined code data and which may also be easily and conveniently cleared of such code data to permit the recording of different tool identification data therein. In the embodiment of FIGS. 1–5, magnetic record members are employed although, as will be apparent from the description set forth hereinafter, mechanical or other data registers could be utilized.

The construction of the individual record members 101 is quite simple and is best shown in FIGS. 3 and 4. As illustrated therein, each of the record members 101 comprises a support member 102 that is affixed to a base 103. The base 103 is secured to the reverse side 104 of the tool matrix 24 in predetermined alignment with respect to the associated one of the toolholder receptacles 27 (see FIGS. 1 and 3). Any suitable means may be utilized to mount the base portion 103 of the record member 101 on the matrix base plate, the screws 105 being used for this purpose in the arrangement shown in FIG. 3.

The support member 101 may be of unitary construction and is preferably a relatively rugged structure. The inner face 106 of the support member is of curved configuration, the curvature corresponding substantially to a circular arc the center of which is the axis of the matrix shaft 25 (FIG. 1). This curved inner surface 106 carries a plurality of individual bands or track 107 of iron oxide or other suitable magnetizable material. The support member 102 should not be formed from a magnetic material, in this instance, but rather should comprise a nonmagnetic element. For example, the support member 102 could be fabricated from non-magnetic stainless steel or any other suitable material. In the construction illustrated in FIG. 3, there are sixteen individual recording tracks 107, affording a total of over 65,000 binary code combinations for tool identification purposes.

FIGS. 3 and 4 also illustrate a transducer head 111 that is employed to record information on the magnetizable tracks 107 of the record member 101. The transducer 111 includes means to erase previously recorded data from the record member 101, thereby clearing the record member for subsequent recording operation. The transducer further includes means to sense data recorded on the tracks 101 without changing the magnetic state of the individual tracks or bands 107. The transducer 111 is relatively simple in construction and comprises a plurality of individual magnetic core members 112 of substantially U-shaped configuration. There is one of the core members 112 for each of the individual recording tracks or bands 107 on the record member 101. A series of electrical windings are provided on each of the magnetic cores 112 as, for example, the windings 113, 114 and 115 shown in FIG. 4. In the following discussion, the winding 113 is identified as the recording winding, the winding 114 comprises the sensing coil, and the winding 115 is the erasing winding for the transducer section comprising the core 112. Each of the cores 112 is provided with a corresponding set of windings, which are employed in essentially the same manner as the windings of a transducer in a magnetic tape or magnetic drum recording device. Preferably, the entire transducer assembly 111 is enclosed in an electrical insulating material 116, the cores and coils being embedded therein. The enclosing material 116 may comprise an epoxy resin or other suitable dielectric material.

The electrical control system for the embodiment of FIGS. 1–4 is illustrated in FIG. 5. As shown therein, each of the individual windings 113–115 of the transducer head 111 is connected to an actuation and control circuit unit 121. Only one winding of each group is illustrated. The control circuit 121, in turn, is connected to a pair of storage registers 131 and 132. The control unit 121 includes suitable relays or other switching devices for connecting the individual windings 113 and 114 of the transducer head 111 to the data storage registers 131 and 132 in accordance with a predetermined subroutine or program sequence as described in further detail hereinafter. For the present, it should be noted that the switching circuits in the control unit 121 must be capable of connecting all of the windings 113 to either of the data storage units to effect a recording operation and must also be capable of connecting all of the windings 114 to either of the data storage devices to permit the sensing and recording of data from the record member 101A in the data storage registers. The control circuit 121 also includes switching means for connecting the erasing windings 115 of the transducer head 111 to a suitable A.C. signal source identified in FIG. 5 as the erase signal source 133.

The two data storage circuits 131 and 132 are coupled to a data storage control circuit 134. The data storage control circuit 134 is connected to a reset circuit 136. The reset circuit is employed to clear the data storage means comprising the registers 131 and 132, as described hereinafter; accordingly, suitable electrical connections are provided from the reset circuit 136 to the two storage units 131 and 132. The data storage control circuit 134 is also provided with an additional input circuit that is connected to a coincidence logic unit 135 to afford a means for controlling selective operation of the two data storage devices.

The coincidence logic circuit 135 is provided with two input circuits, the logic device being employed to compare two sets of tool identification data as explained in detail hereinafter. The first input circuit is connected to the sensing windings 114 of the transducer head 111. The other input circuit for the coincidence logic 135 is coupled to a new-tool storage register 137. The storage register 137, in turn, is coupled to the output of a data input device 138. The device 138 may comprise any suitable programming control apparatus such as, for instance, a tape reader or the like. The data input device 138 is also coupled to the transducer actuation and control unit 121 and to a drive apparatus 139. The drive apparatus 139 may comprise a conventional stepping drive or other suitable forms of drive mechanism, such as a servo positioning motor or the like. The drive 139 is utilized to rotate the tool matrix 24, being connected thereto by the shaft 25. The output of the coincidence logic circuit 135, in addition to the connection to the control circuit 134, is coupled to a tool transfer control circuit 141. The tool transfer control unit 141 may comprise a series of stepping switches or other subroutine control devices and is employed to drive the transfer arm 41 through the control cycle described hereinabove. The tool transfer control unit 141 includes sensing switches, incorporated in the transfer arm 41 and other parts of the machine tool, employed to determine engagement of the transfer arm with the toolholder, latching of the clamps 43 and 47, and release of the toolholder clamps, as referred to generally hereinabove. The tool transfer control unit 141 is also connected to the transducer actuation circuit 121 and to the stepping drive 139 and is utilized, in part, to control operation of these two units. The connection from the tool transfer control unit 141 to the devices 121 and 139 may be either mechanical or electrical.

The control system illustrated in FIG. 5 further comprises a manual transducer 143 which may be essentially similar in construction to the transducer head 111 and includes at least recording and erasing windings similar to the windings 113 and 115 of the main transducer head. In addition, the manual transducer 143 is preferably provided with a sensing winding or windings corresponding to the sensing windings 114 of the transducer head 111. Like the transducer head 111, the manual transducer 143 is mounted upon the frame member 35 beyond the rotatable tool storage matrix 24 as illustrated in FIGS. 1 and 2. Thus, the transducer head 143 establishes a manual recording station at which data may be recorded upon or erased from the record members 101. The transducer head 143 is connected to a manual recording unit 144 that is employed to control the erasing and recording operations. The recording unit 144 may be connected to the same source of erasing signal, the circuit 133, as is employed in connection with the transducer head 111 (see FIG. 5). In addition, the recording unit 144 includes a plurality of manually settable control switches 145 for controlling the recording of coded tool identification data on the record members 101. Typically, the switches 145 may be of the kind which are effective automatically to translate decimal data to binary data. Inasmuch as devices of this kind are commercially available, the construction of the switches or similar translator elements 145 used to control the manual recording of code data is not set forth in detail herein.

In addition, the transducer head 143 may be connected to a visual readout device 146 which, like the recording unit 144, may be mounted on the frame member 35 (see FIG. 1). The device 146 may comprise a plurality of individual numerical display units 147. The internal circuitry of the display unit 146 would preferably include suitable translation circuits for translating the binary code data sensed by the transducer 143 from the recorded data on the members 101 into the more readily understood decimal form. For example, the operating circuits of the display unit 146 may be of the general kind described in the co-pending application of Myron L. Anthony, Serial No. 36,311, filed June 15, 1960, and now Patent No. 3,103,006.

In considering the operation of the tool changing and control system of FIGS. 1–5, with particular reference to the control circuit of FIG. 5, the first matter to be considered relates to the mounting of the individual tools in the storage matrix 24. The tools are inserted in the receptacles 27 on the matrix 24 on an individual basis. Each time a tool is mounted in the matrix, an empty receptacle is first brought to the position 27B wherein its record member 101 is aligned with the manual transducer 143. This position is illustrated in FIGS. 1 and 5 with the record member position being identified by the reference numeral 101B. The corresponding loading position for the toolholder receptacle is identified by the character 27B.

The tools, as received from the toolroom, carry with them some form of code identification. This may comprise a card or slip secured to the tool or toolholder or may comprise a legend marked on the toolholder. The tool is inserted in the receptacle at the position 27B. The machine operator then sets up the accompanying code data on the manual switches or other setting devices 145. The manual recording unit 144 is then energized to record this code data, identifying the tool that has been inserted in the matrix, on the corresponding recording member at the position 101B. This is accomplished using the manual recording transducer 143. The erasing windings of the manual transducer 143 may be energized prior to the recording operation in order to clear any residual code data in the magnetic recording tracks or bands on the record member.

After the first tool has been loaded in the receptacle at the position 27B, and the identifying code data have been recorded on the associated record member, the matrix 24 is jogged to the next position. This may bring an empty toolholder cartridge to the position 27B or it may bring a full toolholder receptacle to this position. In any event, and as described hereinabove, the next tool is mounted in the matrix at position 27B, after emptying the receptacle if necessary. The associated record member 101 is then cleared or erased and the new code data for the second tool are recorded on the code member by means of the manual recording unit 144 and the transducer 143. The same procedure is followed for as many as tools as are necessary for the next sequence of machine operations. It should be noted that no relation need be maintained between the order in which the tools are mounted in the matrix 24 and the sequence in which they are to be employed in machining operations.

During the time that the tools are being loaded in the matrix 24 the remainder of the control circuits illustrated in FIG. 5 need not be in operation. On the other hand, they may be engaged in the control of the final stages in a previous machining operation, as long as none of the tools required for the preceding operation are removed in the course of the location of any tools in the matrix 24. That is, the new tools can be mounted in the matrix despite the fact that a previous machining operation is still in progress, since the machine will not use any of the new tools by mistake, as will be apparent from the description of control operations set forth hereinafter.

With the tools loaded in the matrix 24, the machine is placed in operation. Data supplied to the data input unit 138, in a form of punched tape, punched cards, magnetic tape, or the like, may require the mounting of a particular tool in the spindle 68 at the work station 22 (see FIG. 1). Referring again to FIG. 5, the tool change signal output from the circuit 138 energizes the stepping drive 139 for the tool matrix 24 and at the same time conditions the actuation and control circuit unit 121 for a sensing operation. In addition, the data input device 133 supplies coded tool identification data for the desired tool to the new tool storage circuit 137. The transducer actuation and control circuit 121 selects one of the two storage units 131 and 132 for use in succeeding operations in this tool change cycle. It is assumed hereinafter that the data storage unit 131 has been selected for this operation.

With the stepping drive 139 in operation, the matrix 24 is rotated to position the toolholder receptacles 27 sequentially at the transfer and sensing position 27A. Each time a new toolholder cartridge is brought to the position 27A, it remains there for a relatively short period of time. During this period, the record member at the position 101A is aligned with the transducer head 111. At this time, the code data carried by the record member are sensed, by means of the sensing windings 114 of the transducer head 111. These code data are recorded in the data storage unit 131 and are also supplied to the coincidence logic circuit 135.

In the coincidence logic circuit 135, the code data from the record member 101 at the position 101A are compared with the new tool identification data previously recorded in the storage circuit 137. It may happen that the first tool brought to the position 27A is the desired tool. It may be assumed, however, that the two groups of code data do not coincide on the first sensing operation; that is, the first tool positioned at the sensing location by the stepping drive 139 is not the desired tool. This being the case, the reset circuit 136 clears the recorded data from the storage circuit 131. The stepping drive 139 continues in operation, bringing a second tool to the sensing and transfer location 27A. The search continues in this manner, with the data storage unit 131 being cleared after each comparison operation of the coincidence logic circuit 135, as long as the desired tool is not located.

When the sought-for tool is positioned at the transfer location 27A, the recorded data on the associated record member 101 matches that previously recorded in the new tool storage unit 137. Consequently, in the comparison operation the coincidence logic circuit 135 determines that the desired tool has been located, this determination being based upon comparison of the signals from the sensing windings 114 with the recorded data in the storage circuit 137. The coincidence logic circuit 135 then produces an output signal indicating that the desired tool has been located, this signal being supplied to the tool transfer control unit 141 and to the data storage control circuit 134. The data storage control circuit, in turn, operates to inhibit the reset circuit 136, preventing clearing of the sensed data, from the tool member 101, that has been recorded in the storage unit 131 simultaneously with the application of the sensed code signals to the coincidence logic circuit 135. Thus, the code data identifying the correct tool, which is now to be transferred to the work station of the machine, remains in storage in the data storage circuit 131.

The coincidence signal from the logic circuit 135 actuates the tool transfer control circuit 141, which in turn interrupts operation of the stepping drive 139. That is, the tool transfer control unit prevents further searching movement of the matrix, by the stepping drive 139, through its connection to the matrix 134. The transfer control unit 141 also supplies a suitable actuating signal to the transducer actuation and control apparatus 121 to interrupt the sensing operation of the transducer head 111. Furthermore, the tool transfer control circuit 141 initiates a tool transfer operation, controlling the actions of the tool transfer arm 41 to carry out the sequence of steps described in detail hereinabove. In addition, the actuation and control circuit 121 operates to energize the erasing windings 115 of the transducer head 111 to erase the recorded data from the record member 101 presently located at the sensing station 101A.

Upon completion of the tool transfer operation, a machine operation is initiated under control of the data input circuit 138. Since this portion of the machine control is immaterial with respect to the present invention, the control apparatus and related devices are not illustrated or described herein.

Subsequently, the data input device 138 initiates the search for a new tool to be used in a further machining operation. Again, the stepping drive 139 is initiated and the actuation and control circuit 121 is conditioned to effect a sensing operation, using the transducer head 111 as before. In this instance, however, the circuit 121 connects the sensing windings of the transducer head to the second data storage unit 132 instead of the initial data storage unit 131. In this cycle of the search, as before, the data sensed on the record member positioned at the sensing station 101A is recorded in the data storage unit 132. The sensed data are also supplied to the coincidence logic circuit 135 for comparison with the new tool identification data recorded in the circuit 137 from the data input device 138. When coincidence is found, indicating the location of the desired new tool, the search operation is interrupted as described hereinabove. That is, the stepping drive 139 is interrupted in its operation, the sensing operation is discontinued, and a tool transfer operation is initiated. Moreover, the data storage control unit 134 is actuated to prevent clearing of the data identifying the new tool from the storage circuit 132. In this instance, the transfer operation entails the replacement of the old tool in the matrix 24 as well as the transfer of a new tool to the work station 22 (see FIG. 1).

With the exchange completed, the old tool is mounted in the receptacle at the position 27A that has been vacated in the course of the same transfer process. Upon completion of the transfer operation, an actuating signal is supplied from the transfer control unit 141 to the transducer actuation and control circuit 121. The circuit 121 operates to energize the recording windings 113 of the transducer head 111, recording the data from the storage unit 131 on the record member 101 at the position 101A. This completes the identification cycle, since the tool used in the first operation has now been restored to the matrix 24 and its identifying data is again recorded on the record member associated with the receptacle in which the tool has been deposited. The next cycle of operation repeats the same sequence of steps except that the sensed data are again recorded in the storage unit 131, which is cleared by the reset circuit 136 following recording of the data therefrom on the record member as set forth immediately hereinabove. It is seen therefore, that the identification of a tool is always maintained but that the tool may be replaced at any empty position in the matrix 24, after use, thereby affording a true random access system.

From the foregoing description, it is apparent that the system of the present invention affords all of the flexibility of a true random access system without requiring any modification of the toolholders themselves. In fact, the record members 101 that carry the principal burden of tool identification are quite simple and inexpensive. Moreover, because they are mounted in fixed positions in the matrix, the system does not present any substantial problems with respect to maintenance of critical tolerances on parts carrying code data. That is, because the members 101 are securely mounted on the matrix, it is a relatively simple matter to maintain them in accurate alignment with the immediately related control apparatus comprising the transducer heads 111 and 143. On the other hand, there is no necessity for or use of permanently encoded record members; the code data is easily set up by a machine operator at the time that the tools are installed in the machine. In this regard, it should be noted that the visual indicator device 146 affords a convenient and effective means permitting the operator to check the code data recorded with respect to any tool at the time that the tool is mounted in the storage matrix of the tool storage station 21. The described system comprises a magnetic storage arrangement, but could provide for storage of code data in the form of resettable plungers or other mechanical elements. Furthermore, instead of utilizing magnetic sensing, as described hereinabove, the data could be stored magnetically in elements such as magnetic core storage devices, in which case the sensing apparatus may comprise means affording direct electrical connections to the individual stages of the record members.

FIGS. 6 and 7 illustrate a modification of the present invention based upon and incorporated in a different kind of tool transfer apparatus. FIG. 6 illustrates, in simplified form, a tool transfer system for a machine tool 220. In this instance, the system comprises a tool storage matrix 221, a work station 222, and a transfer device 223 that is employed to transfer tools between the work station 222 and the storage matrix 221. The tool storage matrix 221 is generally similar to the storage means 21, described hereinabove in connection with FIG. 1. It comprises a tool matrix 224 upon which a plurality of individual toolholder cartridges 227 are mounted. In this instance, the tool holder cartridges 227 are constructed in a form which permits the insertion of a toolholder and the removal of a toolholder by movement thereof in a plane parallel to the surface of the toolholder matrix 224. Thus, the system illustrated in FIG. 6 provides for uniplanar tool changing operation and corresponds to the system described and claimed in the copending application of James A. Stark, Serial No. 86,148, filed January 31, 1961. The work station 222, on the other hand, is provided with an operating chuck 268 that is also capable of receiving and mounting a toolholder without requiring displacement of the toolholder from a fixed plane of movement coincident with the surface of the toolholder matrix 224. The chuck and the particular toolholder construction used in conjunction therewith may be of the type described and claimed in the copending application of James A. Stark, Serial No. 43,097, filed July 15, 1960.

The transfer mechanism 223, in this embodiment of the invention, comprises a transfer arm 241 that is mounted for rotation upon a shaft 242. The transfer arm 241 is provided with two oppositely faced toolholder clamps 243 and 247. Both of the clamps or jaws 243 and 247 are shown in open empty condition. The transfer mechanism 223 also includes means for latching the two jaws, independently of each other, to grip a toolholder for transfer between the work station and the tool storage station. Suitable sensing switches are also incorporated in the transfer mechanism to determine when the jaws 243 and 247 are open and closed and also to afford a positive indication as to the presence of a toolholder in either of the jaws.

The sequence of operations in the transfer of tools from the station 221 to the station 222 and back is substantially different than in the previously described embodiment of the invention. In a given tool change operation, the transfer arm 241 may start from the "home" position illustrated in FIG. 6. To pick up a new tool, the transfer arm is rotated in a clockwise direction to engage a toolholder in the receptacle located at the position 227A. When the toolholder is gripped in the jaw 243, the receptacle on the storage matrix is released from engagement with the toolholder and the new tool is removed from the storage matrix by counterclockwise rotation of the transfer arm 241. Usually, the transfer arm is moved to a storage location which may coincide with the "home"

position illustrated in FIG. 6 and remains there until a signal is received indicating that the new tool should be deposited in the chuck 268 at the work station 222.

In the actual exchange of tools, the arm 241 rotates further in a counterclockwise direction until the jaw 247 engages a tool 269 held in the spindle chuck 268. When the jaw 247 has been latched in engagement with the old tool, the tool or toolholder is released by the chuck 268 and the arm 241 continues counterclockwise rotation through a relatively short distance until the new tool or toolholder held in the jaw 243 is aligned with the spindle chuck. The chuck is then actuated to grip the new tool and the jaw 243 is released. The arm 241 then continues its counterclockwise rotation to a position free of the spindle chuck. For example, the arm 241 may at this point be rotated to a position displaced 180° for that shown in FIG. 6.

To replace the old tool in the storage matrix, an empty receptacle is aligned with a second transfer position 227B. The transfer arm 241 is then rotated in counterclockwise direction to bring the old tool held in the jaw 247 into alignment with the empty tool cartridge. When this is accomplished, the receptacle or cartridge at the position 227B is actuated to clamp the old tool and the jaw 247 on the transfer arm is opened. Thereafter, the transfer arm 241 is rotated in a clockwise direction to an alternate home position 180° displaced from the position shown in FIG. 6. On the next tool cycle, the same sequence of steps is repeated except that the new tool is picked up from the matrix at the transfer position 227B and, ultimately, the old tool is replaced in the storage matrix at the position 227A. Thus, the cycle is directly reversed. This dual-cycle operation, using two transfer stations, is described in the co-pending application of Myron L. Anthony, Serial No. 79,272 filed December 29, 1960.

From the foregoing description, it is apparent that the system of FIG. 6 utilizes two different transfer stations, these being the stations 227A and 227B. For this reason, it is necessary to incorporate two read-write-erase stations in the control system for the machine. Thus, in this instance, two independent transducer heads 211A and 211B are employed. The devices 211A and 211B may be essentially similar to the transducer 111 described hereinabove. Each is positioned to record data in and to sense data from a record member that is associated with each of the toolholder receptacles 27. That is, the system of FIG. 6 includes a plurality of record members 201 that may be essentially similar to the record members 101 described in detail in connection with FIGS. 3 and 4. The transducer 211A is aligned with a record member at the position 201A corresponding to the transfer position 227A. The transducer head 211B is aligned with a record member associated with the toolholder receptacle instantaneously located at the second transfer position 227B and identified in FIG. 6 by the reference numeral 201B.

FIG. 7 illustrates a simplified control system for the tool transfer apparatus of FIG. 6, the illustrated portions of the tool transfer apparatus including the toolholder matrix 224 and the receptacle or transfer locations 227A and 227B with their associated record members at positions 201A and 201B in alignment with the transducers 211A and 211B. In this instance the transducer 211A is connected to a data storage unit 231 and the transducer 211B is connected to a similar data storage unit 232. These data storage units may be similar to the storage devices 131 and 132 in the previously described embodiments. The control circuits for the data storage units are identified by the reference numeral 233. In addition, each of the data storage devices 231 and 232 is connected to a coincidence logic circuit 235.

The coincidence logic unit 235 includes an additional input circuit that is connected to a new-tool storage circuit 237. The storage unit 237, in turn, is connected to the output of a data input device 238. The data input device 238, which may be a tape reader or the like, is also connected to the control circuit unit 233 and to a tool transfer control device 236 employed to actuate a stepping drive 239 and to control operation of the transfer arm 241 (see FIG. 6).

A manual control station is also preferably employed in the embodiment of FIGS. 6 and 7. As shown in FIG. 7, this may comprise a manual transducer 253 actuated by a manual control unit 254 and effective to actuate a visual display unit 256. The devices 253, 254 and 256 may be essentially similar to the manual control apparatus 143, 144 and 146 described hereinabove.

In many respects, the operation of the system of FIGS. 6 and 7 is essentially similar to that described hereinabove for the embodiment of FIGS. 1–5. At the outset, tools may be loaded into the matrix 224 by indexing the matrix to position individual receptacles, in sequence, in alignment with the manual transducer 253. As each tool is loaded in the matrix 224, identification data relative thereto is recorded on the associated record member located at the position 201C in FIG. 7. Each of the record members is erased completely before being recorded with any tool identification data corresponding to the tool deposited into the corresponding cartridge in the position 227C.

When the machine is placed in operation, a particular tool is called for and identified by the data input device 238. The signal from the device 238 energizes the transfer control unit 236 which in turn initiates operation of the stepping drive 239. At the same time, the signal is supplied to the control circuit 233 which conditions one of the transducers 211A and 211B for a sensing operation, depending upon the position of the transfer arm 241 (see FIG. 6). To this end, a mechanical or electrical connection may be provided from the transfer control unit 236 to the control circuit 233. Initially, it may be assumed that the data storage unit 231 and the transducer 211A associated therewith are selected for their use in the first dual change operation.

When the tool search is initiated, identification data for the new tool are recorded in the storage circuit 237. As each tool is brought to the position 227A, the record member 201 at the related position 201A is sensed and the code data recorded thereon are supplied to the storage circuit 231. The two groups of code data are compared in the coincidence logic circuit 235. The search is continued, essentially in the manner described above in connection with FIG. 5 until the coincidence logic circuit finds that the desired tool has been located and is positioned in the receptacle at the location 227A. At this time, the coincidence logic circuit produces an output signal that is supplied to the tool transfer control unit 236 to interrupt the search operation. This signal is also supplied to the control circuit 233 to interrupt the sensing operation. The tool transfer control unit 236 also actuates the arm 241 (FIG. 6) to remove the selected tool from the matrix 224 so that it will be available for use at the work station. The control circuit 233, on the other hand, actuates the data storage unit 231 to retain therein the previously sensed data identifying the tool. Thus, the tool identity is maintained in the data storage unit 231. Thereafter, the tool transfer control unit 236 operates to deposit and select the tool at the tool storage matrix and continues in operation to bring the transfer arm to its second home position.

Subsequently, the data input device 238 initiates a second search relative to another new tool. This search is carried out as before except that the transducer 211B and the data storage unit 232 are employed in the searching operation to the exclusion of and instead of the transducers 211A and 231. Ultimately, the desired new tool is located and the tool transfer control 236 is actuated by the output signal from the coincidence logic circuit 235 to interrupt the search and remove the new tool from the matrix. At the same time, the control circuit unit 233 is actuated and operates to retain the identification of the new tool in the data storage unit 232.

Thereafter, the tool transfer control unit 236 is actuated by a suitable output stignal from the device 238 to exchange the new tool for that previously located at the work station, in accordance with the operating cycle described hereinabove except that the direction of movement of the transfer arm is reversed. With the old tool carried by the transfer arm, the tool transfer control brings the arm 241 to its home position and intiates a search for an empty toolholder receptacle. This may be accomplished by using the coincidence logic circuit 235, and by clearing the new tool storage unit 237 so that comparison can be made between the empty storage register and the output signals from the transducer 211A, which is employed to search for the empty receptacle. When an empty toolholder receptacle is located, a suitable output signal is developed by the coincidence logic circuit and is applied to the tool transfer control unit to interrupt operation of the stepping drive 239 and to deposit the tool in the empty receptacle. At the same time, control circuit 233 is actuated to record the previously stored data present in the storage device 231 on the record unit 201 associated with the previously empty receptacle. The transducer 211A is used for this purpose in the same manner as in the embodiment described above in connection with FIG. 5. Of course, it is necessary to effect a clearing or erasure step prior to recording the new data. The process described hereinabove is repeated each time that a new tool is called for by the data input device 238.

It is thus seen that the system of FIGS 6 and 7 is also a true random access system that does not require the encoding of the toolholders themselves. Thus, the same advantages are achieved, despite the substantial difference in the kind of tool transfer apparatus employed in conjunction with the control system.

Hence, while preferred embodiments of the invention have been described and illustrated, it is to be understood that they are capable of variation and modification, and I therefore do not wish to be limited to the precise detatils set forth, but desire to avail myself of such changes and alterations as fall within the purview of the following claims.

I claim:

1. A data control system for a machine of the kind comprising a tool storage station for storing a plurality of tools, a work station, and tool transfer means for transferring tools between said stations, comprising: a plurality of individual record members, associated with respective tool storage locations in said storage station, and each affording an erasable record medium for registering code data identifying an individuale tool in said storage station; sensing means for sensing the code data recorded on said record members; erasing means for clearing the code data from a record member upon removal of the associated tool from said storage station; data storage means, independent of said record members, for effectively storing the code data identifying a tool while separated from the tool storage station; means, coupled to said data storage means, for automatically recording the identifying code data for a given tool on one of said record members upon transfer of the tool to the associated tool storage location in said storage station; and control means, coupled to said sensing means, for actuating said transfer means to transfer selected tools between said storage and work stations.

2. A data control system for a machine of the kind comprising a tool storage station for storing a plurality of tools, a work station, and tool transfer means for transferring tools between said stations, comprising: a plurality of individual erasible record members associated with respective tool storage locations in said storage station; means for registering code data, on said record members, to identify individual tools in said storage station; sensing means for sensing the code data recorded on said record members; data storage means, independent of said record members, for storing the code data identifying a tool while separated from the tool storage station; means, coupled to said data storage means, for automatically re-recording the identifying code data on one of said record members upon restoration of a tool to said storage station; and control means, coupled to said sensing means, for actuating said transfer means to transfer selected tools between said storage and work stations.

3. A data control system for a machine of the kind comprising a tool storage matrix for storing a plurality of tools, a work station, and tool transfer means for transferring tools therebetween, comprising: a plurality of individual erasable record members, mounted in said storage matrix at respective tool storage locations therein and each affording a data register for code data identifying an individual tool; sensing means for sensing the code data recorded on said record members; data storage means, independent of said record members, for effectively storing the code data identifying a tool while separated from the storage matrix; means, coupled to said data storage means, for automatically recording the identifying code data for a given tool on one of said record members upon transfer of the tool to the associated tool storage location in said matrix; and control means, coupled to said sensing means, for actuating said transfer means to transfer selected tools between said storage matrix and said work station.

4. A data control system for a machine of the kind comprising a tool storage matrix for storing a plurality of tools and for moving said tools to a transfer position, a work station, and tool transfer means for transferring tools between said work station and said transfer position, comprising: a plurality of individual erasable record members mounted at respective tool storage locations in said matrix; means for registering code data, on said record members, to identify individual tools in said matrix; sensing means for sensing the code data from the one of said record members located at said transfer position; erasing means for clearing the code data from a record member upon removal of the associated tool from said matrix; data storage means, independent of said record members, for effectively storing the code data identifying a tool while separated from the storage matrix; means coupled to said storage means, for automatically re-recording the identifying code data on one of said record members upon restoration of each tool to said matrix; and control means, coupled to said sensing means, for actuating said transfer means to transfer selected tools between said storage and work stations.

5. A data control system for a machine of the kind comprising a tool storage station for storing a plurality of tools, a work station, and tool transfer means for transferring tools between said stations, comprising: a plurality of individual magnetizable record members, associated with respective tool storage locations in said tool storage station; magnetic sensing means for sensing the code data recorded on said record member; erasing means for magnectically erasing the code data from a record member upon removal of the associated tool from said tool storage station; data storage means, independent of said record members, for effectively storing the code data identifying a tool while separated from the tool storage station; means, coupled to said data storage means, for automatically recording the identifying code data for a given tool on one of said record members upon transfer of the tool to said matrix; and control means, coupled to said sensing means, for actuating said transfer means to transfer selected tools between said storage and work stations.

6. A data control system for a machine of the kind comprising a tool storage station for storing a plurality of tools, a work station, and tool transfer means for transferring tools between said stations, comprising: a plurality of individual erasable record members, mounted at said storage station in association with respective tool storage locations therein; manually operable means for recording code data, on said record members, to identify individual tools in said tool storage station; sensing means for sensing the code data recorded on said record member; means for erasing the code data from a record member upon removal of the associated tool from said tool storage station; storage means, independent of said record members, for effectively storing the code data identifying a tool while separated from the tool storage station; means, coupled to said storage means, for automatically re-recording the identifying code data on one of said record members upon restoration of each tool to said tool storage station; and control means, coupled to said sensing means, for actuating said transfer means to transfer selected tools between said storage and work stations.

7. A data programmed machine tool comprising: data reading means for reading a data storage medium containing data respecting operation of the machine; a tool storage matrix operable in response to said reading means for interchanging selected tools with said machine; tool identification means, for identifying tools for interchange, comprising a plurality of erasable record members corresponding to individual tool storage positions in said matrix; and means for erasing and subsequently re-recording the tool identification data on said record members upon transfer of tools from and to said tool storage matrix.

8. A data programmed machine tool comprising: data reading means for reading a data storage medium containing data respecting operation of the machine; a tool storage matrix operable in response to said reading means for interchanging selected tools with said machine; tool identification means for identifying tools for interchange comprising a plurality of erasable record members corresponding to individual tool storage positions in said matrix; means, independent of said record members, for storing the tool identification data while the tool is out of the storage matrix; and means for automatically re-recording the tool identification data for said one tool on one of said record members upon restoration of the tool to the tool storage position corresponding to said one record member.

9. A data programmed machine tool comprising: data reading means for reading a data storage medium containing data respecting operation of the machine; a tool storage matrix operable in response to said reading means for interchanging selected tools with said machine; tool identification means for identifying tools for interchange comprising a plurality of erasable record members corresponding to individual tool storage positions in said matrix; manually controllable means for registering code data on said record members to identify individual tools; and means for subsequently re-recording the tool identification data on said record members upon transfer of tools from and to said tool storage matrix.

10. A machine tool comprising: a storage matrix including individual tool receptacles for storing a plurality of different tools; a corresponding plurality of individual code members in one-for-one association with said tool receptacles and each affording a re-settable register for registering code data identifying a tool; sensing means for sensing code data on individual code members; means, actuated by said sensing means, for transferring said tools between a work station and said storage matrix; and means for clearing and subsequently re-registering the code data identifying a given tool each time the tool is transferred to the work station and back to the storage matrix.

11. A machine tool comprising: a storage matrix including individual tool receptacles for storing a plurality of different tools; a corresponding plurality of individual code members mounted in said matrix in one-for-one association with said tool receptacles and each affording a re-settable register for registering code data identifying a tool; means for moving said matrix to bring said code members sequentially to an identification location; sensing means for sensing code data on a code member at said identification location; means, actuated by said sensing means, for transferring said tools between a work station and said identification location; and means for subsequently re-registering the code data identifying a given tool each time the tool is transferred to the work station and back to the storage matrix.

12. A machine tool comprising: a storage matrix including individual tool receptacles for storing a plurality of different tools; a corresponding plurality of individual re-settable code members in one-for-one association with said tool receptacles and each affording a register for registering code data identifying a tool; manually operable means for registering code data on said record members; sensing means for sensing code data on individual code members; means, actuated by said sensing means, for transferring said tools between a work station and said storage matrix; means for clearing the code data identifying a given tool from a record member each time the tool is transferred to the work station; data storage means, independent of said record members, for storing the code data when the tool is transferred to the work station; and means, connected to said data storage means, for re-registering the code data on one of said code members upon re-transfer of the tool to the storage matrix.

13. A machine tool comprising: storage means comprising a plurality of tool storage receptacles for storing a plurality of different tools; data-controlled means for automatically moving said tools, in predetermined sequence, into operating position at a work station and back to said storage means; and tool identification means comprising individual re-settable code registers in one-for-one association with said tool receptacles, each of said code registers being effective to record code data distinguishing an associated tool from the other tools in the storage means.

14. A machine tool comprising: storage means comprising a plurality of tool storage receptacles for storing a plurality of different tools; data-controlled means for automatically moving said tools, in predetermined sequence, into operating position at a work station and back to said storage means; tool identification means comprising individual re-settable magnetic code registers mounted in said storage means in one-for-one association with said tool receptacles, each of said code registers being effective to record code data distinguishing an associated tool from the other tools in the storage means; and manually operable recording means for recording code data in said record registers.

References Cited in the file of this patent
UNITED STATES PATENTS

| | | |
|---|---|---|
| 2,770,797 | Hamilton | Nov. 13, 1956 |
| 2,922,332 | Lentz et al. | Jan. 26, 1960 |
| 2,988,237 | Devol | June 13, 1961 |
| 3,052,011 | Brainard et al. | Sept. 4, 1962 |

OTHER REFERENCES

"Planning for Manufacturing," Kearney and Trecker Manual W5–59, Scientific Library TJ 1189, K4, C.Z.